US012672087B2

(12) United States Patent
Gupta et al.

(10) Patent No.: US 12,672,087 B2
(45) Date of Patent: Jun. 30, 2026

(54) TERMINAL REGISTRATION PROCESSING FOR AERIAL SERVICES

(71) Applicant: NOKIA TECHNOLOGIES OY, Espoo (FI)

(72) Inventors: Pallab Gupta, Bangalore (IN); Saurabh Khare, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 607 days.

(21) Appl. No.: 18/045,274

(22) Filed: Oct. 10, 2022

(65) Prior Publication Data

US 2023/0113854 A1    Apr. 13, 2023

(30) Foreign Application Priority Data

Oct. 11, 2021    (IN) .............................. 202141046265

(51) Int. Cl.
*H04W 60/04*        (2009.01)
*H04W 48/16*        (2009.01)
*H04W 84/06*        (2009.01)

(52) U.S. Cl.
CPC ........... *H04W 60/04* (2013.01); *H04W 48/16* (2013.01); *H04W 84/06* (2013.01)

(58) Field of Classification Search
CPC ..... H04W 48/16; H04W 60/04; H04W 84/06; H04W 8/24; H04W 60/00
See application file for complete search history.

(56) References Cited

U.S. PATENT DOCUMENTS

2021/0336797 A1*  10/2021  Van Duren ........... H04L 9/0825

OTHER PUBLICATIONS

"3rd Generation Partnership Project; Technical Specification Group Core Network and Terminals; 5G System; Unified Data Management Services; Stage 3 (Release 17)", 3GPP TS 29.503 v17.4.0, (Sep. 2021), 440 pages.
"3rd Generation Partnership Project; Technical Specification Group Services and System Aspects; Procedures for the 5G System (5GS); Stage 2 (Release 17)", 3GPP TS 23.502 v17.2.1, (Sep. 2021), 712 pages.
"3rd Generation Partnership Project; Technical Specification Group Services and System Aspects; Support of Uncrewed Aerial Systems (UAS) connectivity, identification and tracking; Stage 2 (Release 17)", 3GPP TS 23.256 v17.0.0, (Sep. 2021), 47 pages.
"3rd Generation Partnership Project; Technical Specification Group Services and System Aspects; Uncrewed Aerial System (UAS) support in 3GPP; Stage 1; Release 17", 3GPP TS 22.125 v17.4.0, (Sep. 2021), 16 pages.
Nokia et al., "Network Triggered UE Re-Registration for Aerial Services when Aerial Subscription is Enabled", 3GPP TSG-WG SA2 Meeting #147E e-meeting, S2-2107588, Change Request 0021, (Oct. 18-22, 2021), 4 pages.

* cited by examiner

*Primary Examiner* — Diane D Mizrahi

(74) *Attorney, Agent, or Firm* — Nokia Technologies Oy

(57)    ABSTRACT

There are provided measures for improvement of terminal registration processing for aerial services. Such measures exemplarily comprise, e.g. at a first network entity for managing network access, receiving information indicative of unmanned aerial vehicle related capabilities of a communication endpoint, discovering that unmanned aerial system related services are enabled for said communication endpoint, and transmitting, towards said communication endpoint, an unmanned aerial system service status initiated indication providing information in relation to a present registration of said communication endpoint to a network.

8 Claims, 13 Drawing Sheets

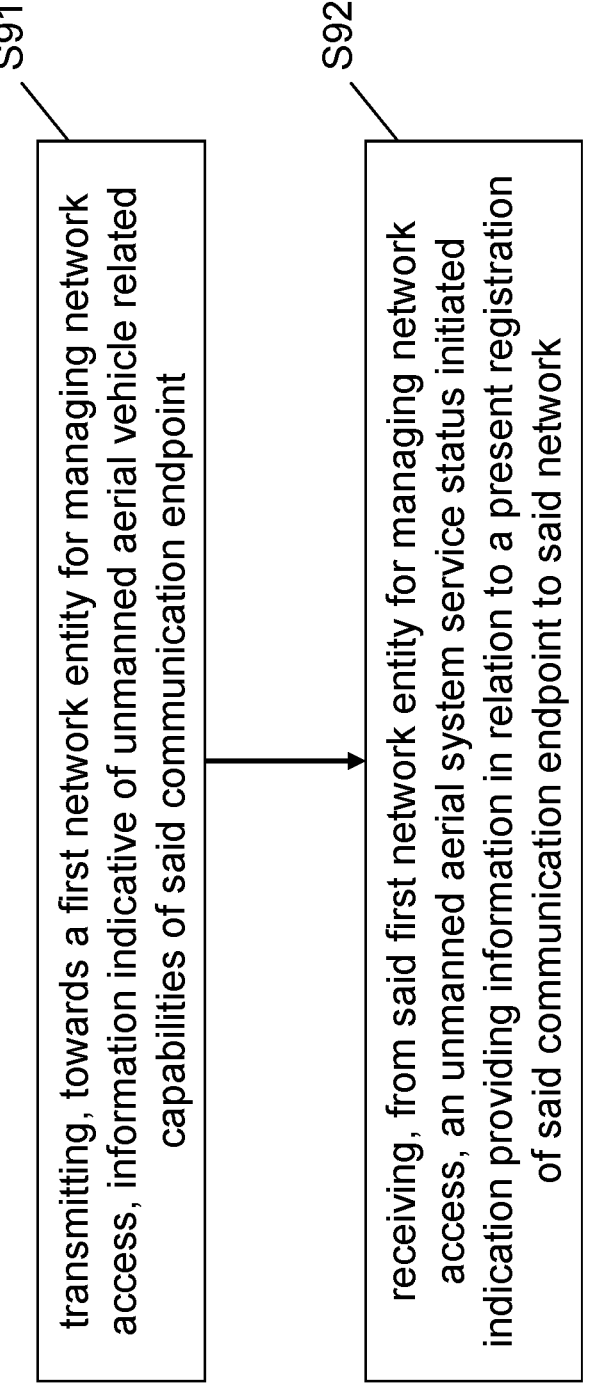

S91 transmitting, towards a first network entity for managing network access, information indicative of unmanned aerial vehicle related capabilities of said communication endpoint

S92 receiving, from said first network entity for managing network access, an unmanned aerial system service status initiated indication providing information in relation to a present registration of said communication endpoint to said network

Fig. 9

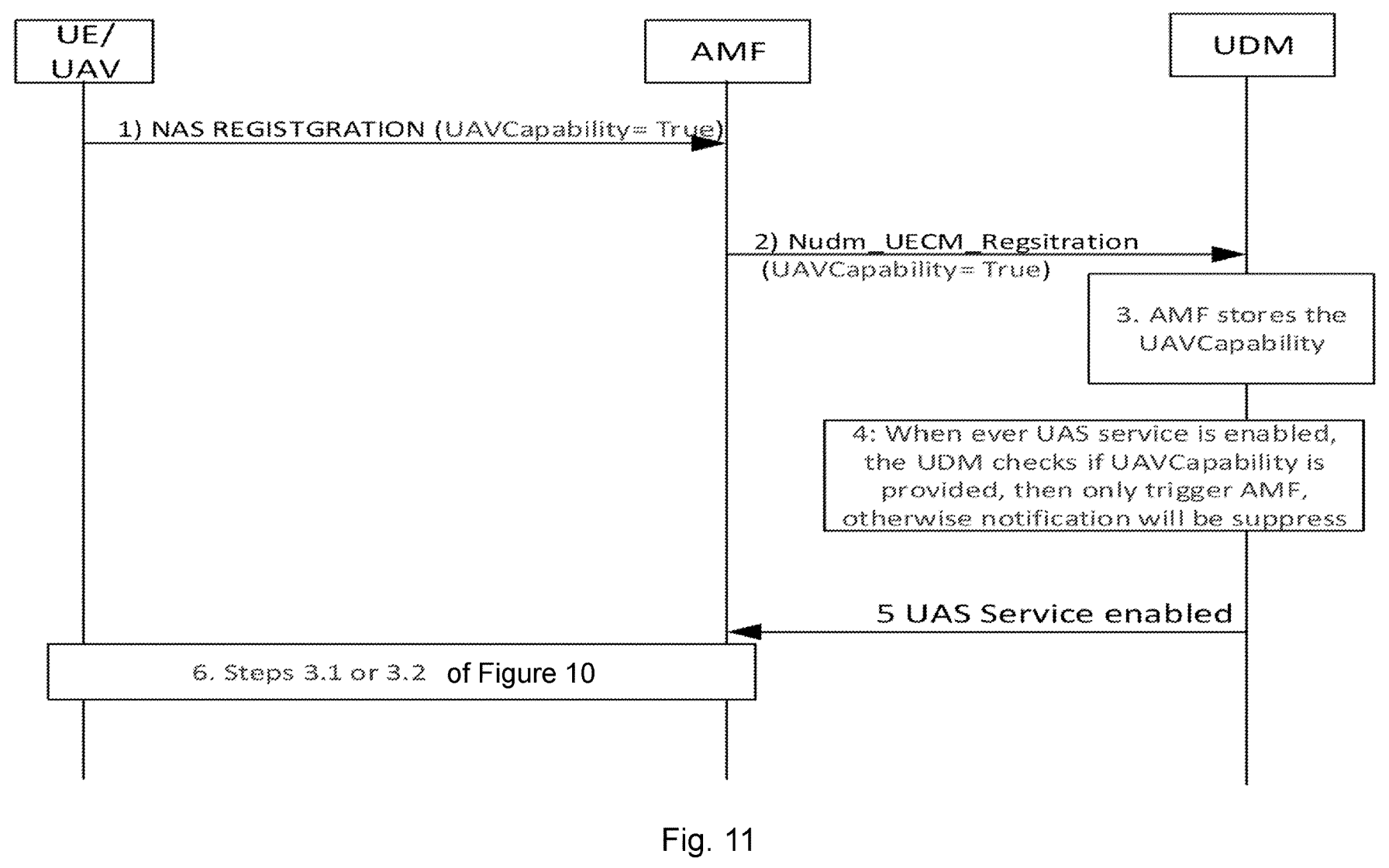

UDM

AMF

UE/UAV

1) NAS REGISTGRATION (UAVCapability= True)

2) Nudm_UECM_Regsitration (UAVCapability= True)

3. AMF stores the UAVCapability

4: When ever UAS service is enabled, the UDM checks if UAVCapability is provided, then only trigger AMF, otherwise notification will be suppress.

5 UAS Service enabled

6. Steps 3.1 or 3.2 of Figure 10

Fig. 11

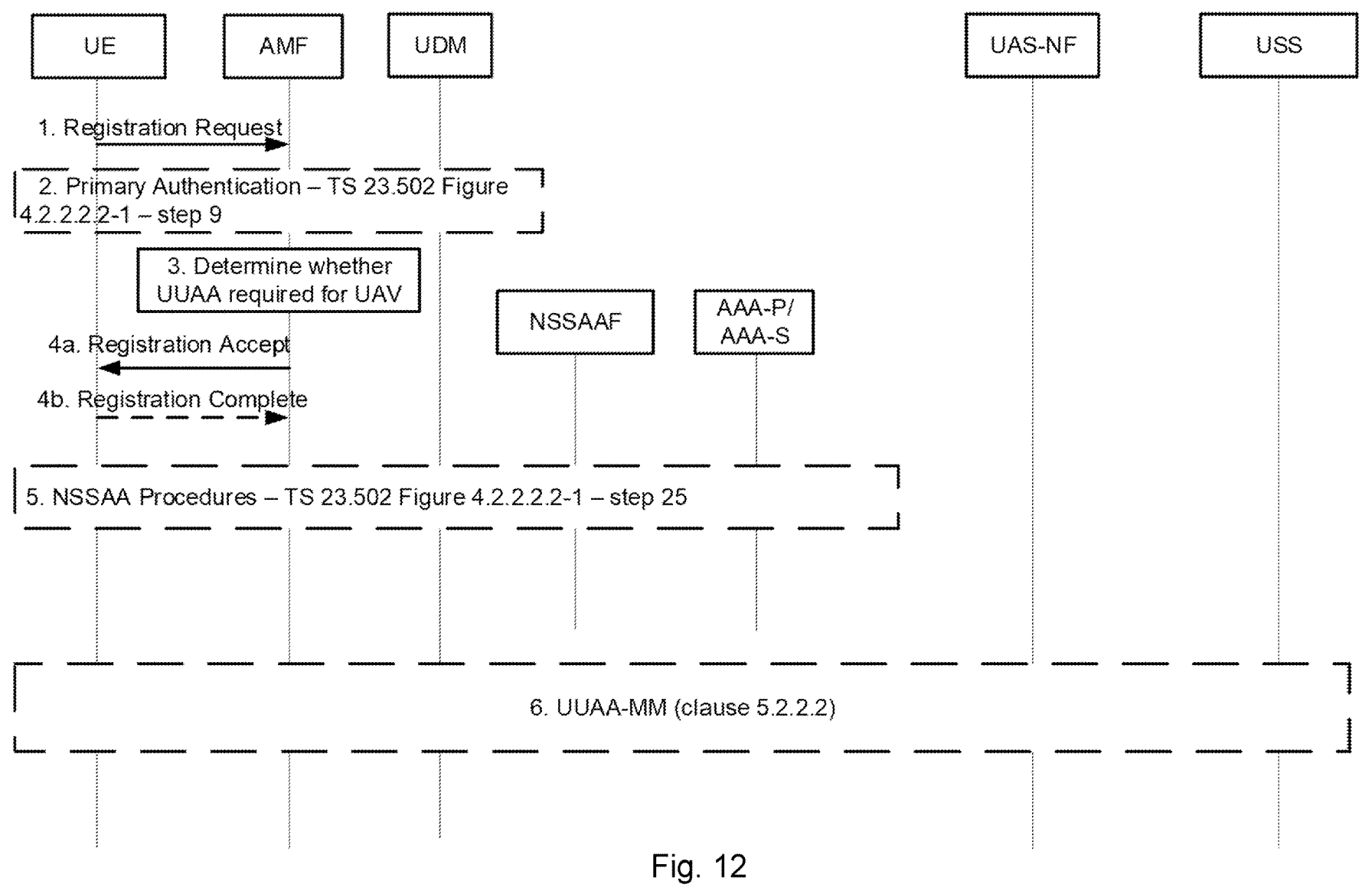

USS

UAS-NF

AAA-P/
AAA-S

NSSAAF

UDM

AMF

UE

1. Registration Request

2. Primary Authentication – TS 23.502 Figure
4.2.2.2-1 – step 9

3. Determine whether
UUAA required for UAV

4a. Registration Accept

4b. Registration Complete

5. NSSAA Procedures – TS 23.502 Figure 4.2.2.2-1 – step 25

6. UUAA-MM (clause 5.2.2.2)

Fig. 12

TERMINAL REGISTRATION PROCESSING FOR AERIAL SERVICES

CROSS-REFERENCE TO RELATED APPLICATIONS

This application claims priority to Indian Application No. 202141046265, filed Oct. 11, 2021, the entire contents of which are incorporated herein by reference.

FIELD

Various example embodiments relate to improvement of terminal registration processing for aerial services. More specifically, various example embodiments exemplarily relate to measures (including methods, apparatuses and computer program products) for realizing improvement of terminal registration processing for aerial services.

BACKGROUND

The present specification generally relates to unmanned (or uncrewed) aerial systems (UAS) and mobile communication in relation to UAS. Specifically, the present specification relates to architecture enhancements for supporting UAS connectivity, identification, and tracking.

Currently, at the aviation level an unmanned (or uncrewed) aerial vehicle (UAV) is identified by a civil aviation authority (CAA)—Level UAV ID. At the $3^{rd}$ Generation Partnership Project (3GPP) level, a user equipment (UE) that is used with an UAV ("aerial UE") is identified using an aerial indication at the subscription level.

In addition to the normal UE authentication/authorization, the 3GPP system also performs authentication/authorization of the UAV identity (CAA-Level UAV ID) by the UAS service supplier (USS)/UAS traffic management (UTM), before allowing any services to the aerial UE in the network. The authentication/authorization of the CAA-Level UAV ID may be performed at 5GS Registration or during packet data unit (PDU) session establishment. The aerial UE (used in the UAV) always includes the CAA-Level UAV ID of the UAV in a registration request and in a PDU session establishment request.

If the authentication/authorization of the CAA-Level UAV ID fails, the 3GPP system may keep the UE (used in the UAV) registered to the network and ensure that the UE is not allowed to access any UAS specific services, i.e., data network name (DNN)/single network slice selection assistance information (S-NSSAI) specific to UAS services are not allowed.

From a current procedure for USS UAV authorization/authentication (UUAA) at Registration in 5GS (UUAA-MM), e.g., as described in TS 23.256, it is specified that if the UE used with a UAV does not have aerial services/subscription enabled in unified data management (UDM), then the AMF rejects the registration request with indication that "UAS services is not allowed". This triggers the UAV to not re-register including the CAA-Level UAV ID.

In particular, according thereto, if UUAA is configured in the access and mobility management function (AMF) to be performed during 5GS registration and the UE has provided a CAA-Level UAV ID in the registration request, but the UE does not have an aerial subscription in the UE subscription data retrieved from the unified data management (UDM), then the AMF rejects the registration with an indication that UAS services are is not allowed which triggers the UAV to not re-register for aerial services and ensures that the UE is not allowed to access any aerial service.

If the UE wants to use the 3GPP network for other services (i.e. non UAS services), the UE may then register to the network without providing the CAA-Level UAV ID, which will mean that the 3GPP system will allow the UE to register as a normal UE.

From this current procedure, it is not clear when and how the UE determines to re-register for aerial services (i.e., to include the CAA-Level UAV ID in the registration request). That is, when the UE had tried to access the network by providing the CAA-Level UAV ID in the registration request, and the network had rejected the registration request with an indication that "UAS services are not allowed", the UE will never again try to access the network using CAA-Level UAV ID, potentially leaving both the UE and the network in an unspecified state.

Hence, the problem arises that both the UE and the network are potentially left in an unspecified state, and it is particularly unspecified how to enable an UE used with an UAV, after the initial registration request from the UE with CAA-Level UAV ID was rejected by the network, to re-register with CAA-Level UAV ID when aerial services are enabled for the UE in subscription data.

Hence, there is a need to provide for improvement of terminal registration processing for aerial services.

SUMMARY

Various example embodiments aim at addressing at least part of the above issues and/or problems and drawbacks.

Various aspects of example embodiments are set out in the appended claims.

According to an exemplary aspect, there is provided a method of a first network entity for managing network access comprising receiving information indicative of unmanned aerial vehicle related capabilities of a communication endpoint, discovering that unmanned aerial system related services are enabled for said communication endpoint, and transmitting, towards said communication endpoint, an unmanned aerial system service status initiated indication providing information in relation to a present registration of said communication endpoint to a network.

According to an exemplary aspect, there is provided a method of a second network entity for managing network user data comprising receiving information indicative of unmanned aerial vehicle related capabilities of a communication endpoint, discovering that unmanned aerial system related services are enabled for said communication endpoint, and transmitting, towards a first network entity for managing network access, a trigger message indicative of that said unmanned aerial system related services are enabled for said communication endpoint.

According to an exemplary aspect, there is provided a method of a communication endpoint, for registering the communication endpoint to a network, the method comprising transmitting, towards a first network entity for managing network access, information indicative of unmanned aerial vehicle related capabilities of said communication endpoint, and receiving, from said first network entity for managing network access, an unmanned aerial system service status initiated indication providing information in relation to a present registration of said communication endpoint to said network.

According to an exemplary aspect, there is provided an apparatus of a first network entity for managing network access comprising receiving circuitry configured to receive information indicative of unmanned aerial vehicle related capabilities of a communication endpoint, discovering circuitry configured to discover that unmanned aerial system related services are enabled for said communication endpoint, and transmitting circuitry configured to transmit, towards said communication endpoint, an unmanned aerial system service status initiated indication providing information in relation to a present registration of said communication endpoint to a network.

According to an exemplary aspect, there is provided an apparatus of a second network entity for managing network user data comprising receiving circuitry configured to receive information indicative of unmanned aerial vehicle related capabilities of a communication endpoint, discovering circuitry configured to discover that unmanned aerial system related services are enabled for said communication endpoint, and transmitting circuitry configured to transmit, towards a first network entity for managing network access, a trigger message indicative of that said unmanned aerial system related services are enabled for said communication endpoint.

According to an exemplary aspect, there is provided an apparatus of a communication endpoint, for registering the communication endpoint to a network, the apparatus comprising transmitting circuitry configured to transmit, towards a first network entity for managing network access, information indicative of unmanned aerial vehicle related capabilities of said communication endpoint, and receiving circuitry configured to receive, from said first network entity for managing network access, an unmanned aerial system service status initiated indication providing information in relation to a present registration of said communication endpoint to said network.

According to an exemplary aspect, there is provided an apparatus of a first network entity for managing network access comprising at least one processor, at least one memory including computer program code, and at least one interface configured for communication with at least another apparatus, the at least one processor, with the at least one memory and the computer program code, being configured to cause the apparatus to perform receiving information indicative of unmanned aerial vehicle related capabilities of a communication endpoint, discovering that unmanned aerial system related services are enabled for said communication endpoint, and transmitting, towards said communication endpoint, an unmanned aerial system service status initiated indication providing information in relation to a present registration of said communication endpoint to a network.

According to an exemplary aspect, there is provided an apparatus of a second network entity for managing network user data comprising at least one processor, at least one memory including computer program code, and at least one interface configured for communication with at least another apparatus, the at least one processor, with the at least one memory and the computer program code, being configured to cause the apparatus to perform receiving information indicative of unmanned aerial vehicle related capabilities of a communication endpoint, discovering that unmanned aerial system related services are enabled for said communication endpoint, and transmitting, towards a first network entity for managing network access, a trigger message indicative of that said unmanned aerial system related services are enabled for said communication endpoint.

According to an exemplary aspect, there is provided an apparatus of a communication endpoint, for registering the communication endpoint to a network, the apparatus comprising at least one processor, at least one memory including computer program code, and at least one interface configured for communication with at least another apparatus, the at least one processor, with the at least one memory and the computer program code, being configured to cause the apparatus to perform transmitting, towards a first network entity for managing network access, information indicative of unmanned aerial vehicle related capabilities of said communication endpoint, and receiving, from said first network entity for managing network access, an unmanned aerial system service status initiated indication providing information in relation to a present registration of said communication endpoint to said network.

According to an exemplary aspect, there is provided a computer program product comprising computer-executable computer program code which, when the program is run on a computer (e.g. a computer of an apparatus according to any one of the aforementioned apparatus-related exemplary aspects of the present disclosure), is configured to cause the computer to carry out the method according to any one of the aforementioned method-related exemplary aspects of the present disclosure.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an aerial UE to re-register with CAA-Level UAV ID when aerial services are enabled for the UE in subscription data in an efficient and clear manner to thereby solve at least part of the problems and drawbacks identified in relation to the prior art.

By way of example embodiments, there is provided improvement of terminal registration processing for aerial services. More specifically, by way of example embodiments, there are provided measures and mechanisms for realizing improvement of terminal registration processing for aerial services.

Thus, improvement is achieved by methods, apparatuses and computer program products enabling/realizing improvement of terminal registration processing for aerial services.

BRIEF DESCRIPTION OF THE DRAWINGS

In the following, the present disclosure will be described in greater detail by way of non-limiting examples with reference to the accompanying drawings, in which FIG. 9 is a schematic diagram of a procedure according to example embodiments, FIG. 11 shows a schematic diagram of signaling sequences according to example embodiments, FIG. 12 shows a schematic diagram of signaling sequences according to example embodiments.

DETAILED DESCRIPTION

Figure 1:
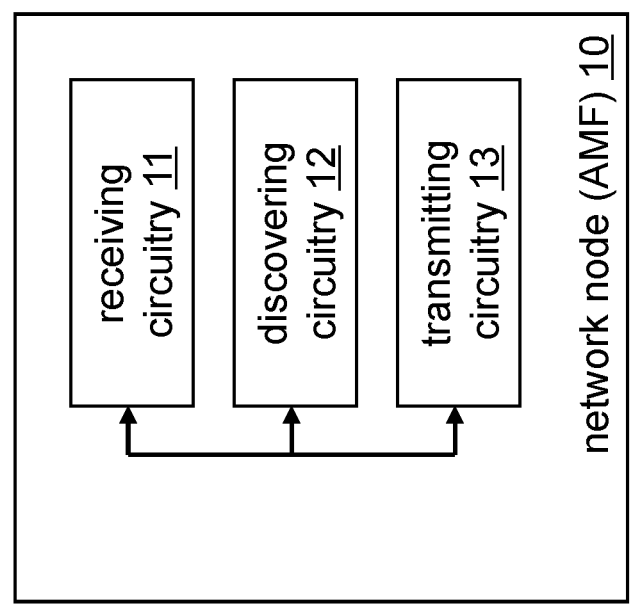
FIG. 1 is a block diagram illustrating an apparatus according to example embodiments.

The present disclosure is described herein with reference to particular non-limiting examples and to what are presently considered to be conceivable embodiments. A person skilled in the art will appreciate that the disclosure is by no means limited to these examples, and may be more broadly applied.

It is to be noted that the following description of the present disclosure and its embodiments mainly refers to specifications being used as non-limiting examples for certain exemplary network configurations and deployments. Namely, the present disclosure and its embodiments are mainly described in relation to 3GPP specifications being used as non-limiting examples for certain exemplary network configurations and deployments. As such, the description of example embodiments given herein specifically refers to terminology which is directly related thereto. Such terminology is only used in the context of the presented non-limiting examples, and does naturally not limit the disclosure in any way. Rather, any other communication or communication related system deployment, etc. may also be utilized as long as compliant with the features described herein.

Hereinafter, various embodiments and implementations of the present disclosure and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to example embodiments, in general terms, there are provided measures and mechanisms for (enabling/realizing) improvement of terminal registration processing for aerial services.

Namely, in brief, according to example embodiments, a UE provides an indication to the network, in a registration request, that it supports UAV Capability, or, in other words, the UE is being used with a UAV. This indication is used by the network to identify the UEs that are used with UAVs but have registered as normal UEs e.g. due to an earlier rejection of UE's registration request with CAA-Level UAV ID, by the network, with an indication that UAS services are not allowed. When UAS services are enabled in the network at UE's subscription level (i.e. UDM), then the network can decide to inform the UE based on the above indication from the UE. The network may deregister and ask the UE to register back again with CAA-Level UAV ID or configure the UE to inform that UAS services are enabled now.

In so doing, according to example embodiments, advantageously, the network can figure out the UEs that are actually used with a UAV and only ask those (aerial) UEs to re-register with UAS services.

Further, according to example embodiments, advantageously, the UE will also know when UAS services will be enabled at the UE's subscription and accordingly will try to register back again with UAS services.

Further, according to example embodiments, advantageously, signaling reduction towards the UE is achieved.

Example embodiments are specified below in more detail.

Figure 7:
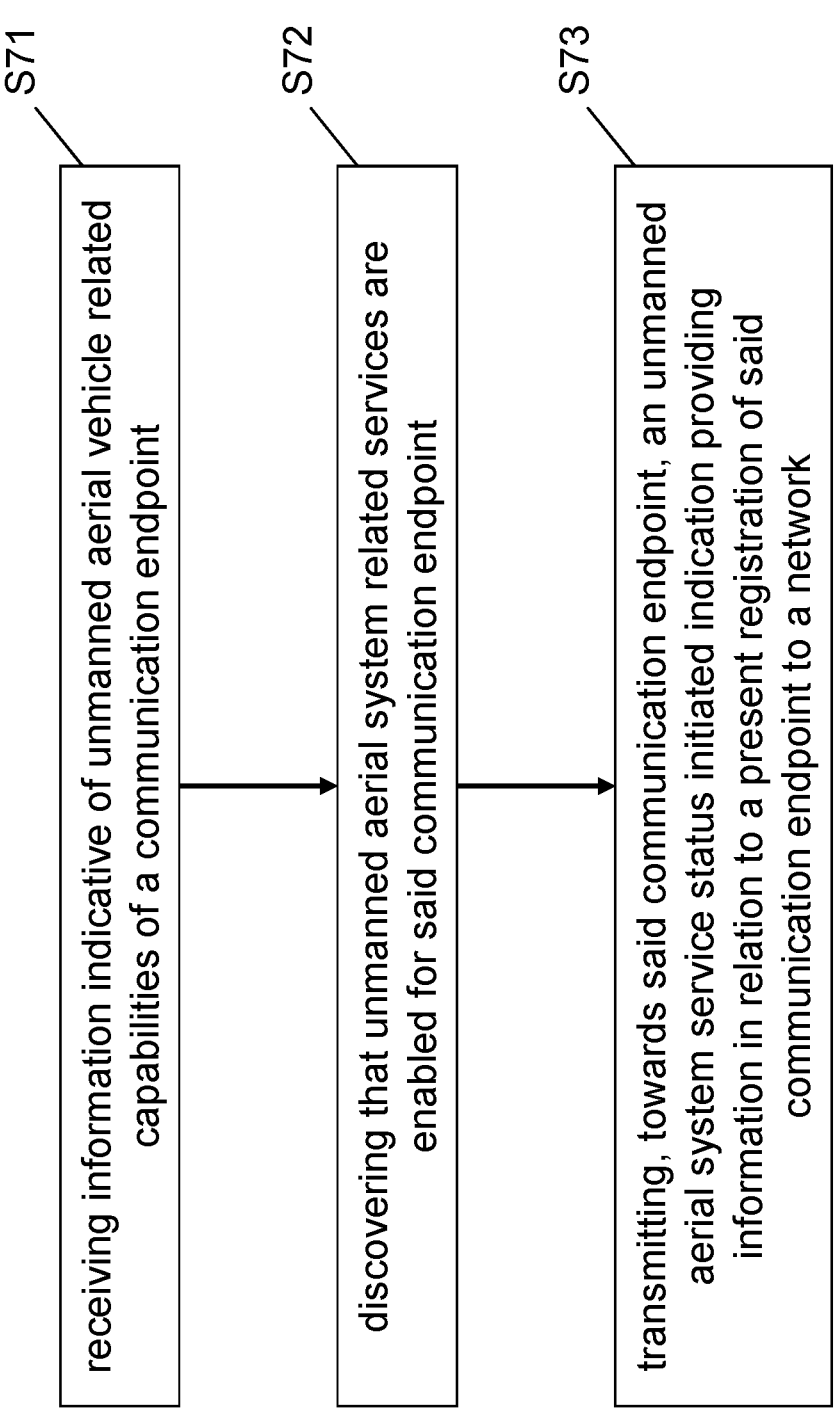
FIG. 7 is a schematic diagram of a procedure according to example embodiments.

FIG. 1 is a block diagram illustrating an apparatus according to example embodiments. The apparatus may be a network node or entity 10 (e.g. a first network entity for managing network access, such as an access and mobility management function entity) comprising a receiving circuitry 11, a discovering circuitry 12, and a transmitting circuitry 13. The receiving circuitry 11 receives information indicative of unmanned aerial vehicle related capabilities of a communication endpoint. The discovering circuitry 12 discovers that unmanned aerial system related services are enabled for said communication endpoint. The transmitting circuitry 13 transmits, towards said communication endpoint, an unmanned aerial system service status initiated indication providing information in relation to a present registration of said communication endpoint to a network. FIG. 7 is a schematic diagram of a procedure according to example embodiments. The apparatus according to FIG. 1 may perform the method of FIG. 7 but is not limited to this method. The method of FIG. 7 may be performed by the apparatus of FIG. 1 but is not limited to being performed by this apparatus.

As shown in FIG. 7, a procedure according to example embodiments comprises an operation of receiving (S71) information indicative of unmanned aerial vehicle related capabilities of a communication endpoint, an operation of discovering (S72) that unmanned aerial system related services are enabled for said communication endpoint, and an operation of transmitting (S73), towards said communication endpoint, an unmanned aerial system service status initiated indication providing information in relation to a present registration of said communication endpoint to a network.

Figure 2:
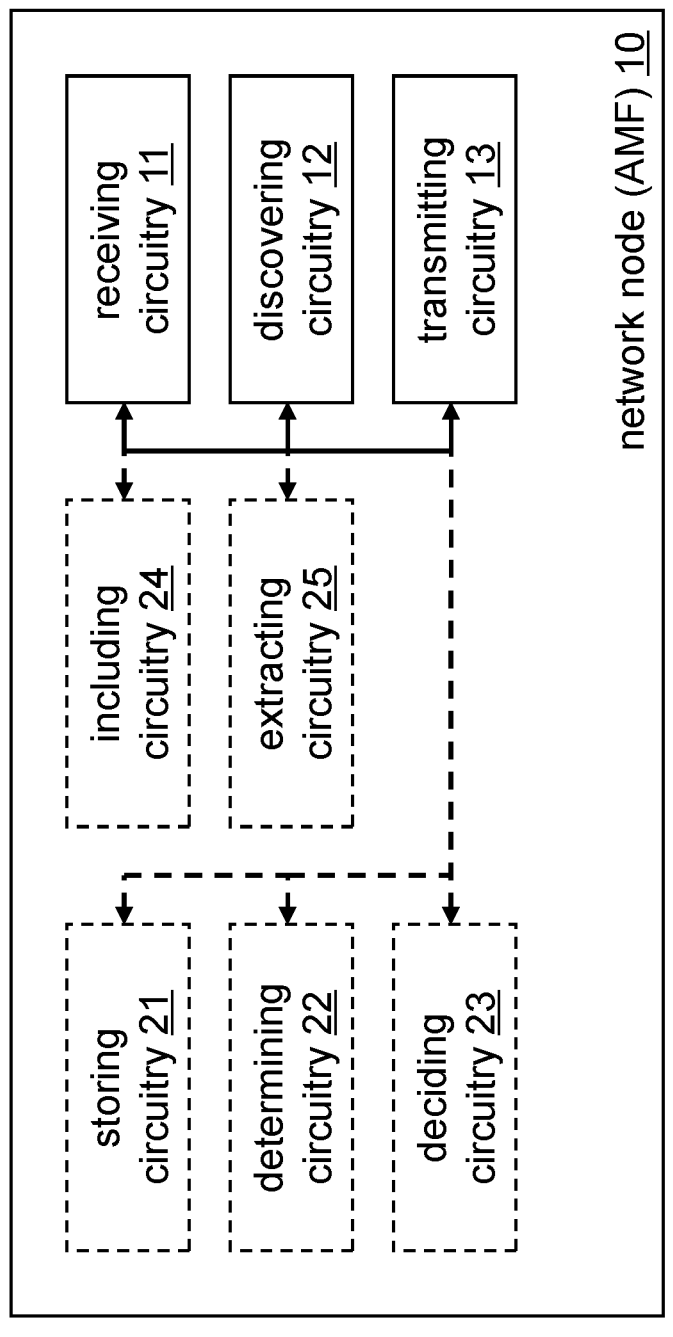
FIG. 2 is a block diagram illustrating an apparatus according to example embodiments.

FIG. 2 is a block diagram illustrating an apparatus according to example embodiments. In particular, FIG. 2 illustrates a variation of the apparatus shown in FIG. 1. The apparatus according to FIG. 2 may thus further comprise a storing circuitry 21, a determining circuitry 22, a deciding circuitry 23, an including circuitry 24, and/or an extracting circuitry 25.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 7, exemplary additional operations are given, which are inherently independent from each other as such. According to such variation, an exemplary method according to example embodiments may comprise an operation of storing said information.

According to a variation of the procedure shown in FIG. 7, exemplary additional operations and exemplary details of the transmitting operation (S73) are given, which are inherently independent from each other as such. According to such variation, an exemplary method according to example embodiments may comprise an operation of determining, based on said information, whether said unmanned aerial vehicle related capabilities of said communication endpoint exist or not. Further, such exemplary transmitting operation (S73) according to example embodiments may comprise an operation of deciding to transmit, towards said communication endpoint, said unmanned aerial system service status initiated indication, if said unmanned aerial vehicle related capabilities of said communication endpoint are determined to exist, and an operation of deciding to not transmit, towards said communication endpoint, said unmanned aerial system service status initiated indication, if said unmanned aerial vehicle related capabilities of said communication endpoint are determined to not exist.

According to a variation of the procedure shown in FIG. 7, exemplary additional operations are given, which are inherently independent from each other as such. According to such variation, an exemplary method according to example embodiments may comprise an operation of transmitting said received information indicative of said unmanned aerial vehicle related capabilities of said communication endpoint towards a second network entity for managing network user data.

According to a variation of the procedure shown in FIG. 7, exemplary details of the transmitting operation (transmitting said received information indicative of said unmanned aerial vehicle related capabilities of said communication endpoint towards said second network entity for managing network user data) are given, which are inherently independent from each other as such. Such exemplary transmitting operation according to example embodiments may comprise an operation of including said received information indicative of said unmanned aerial vehicle related capabilities of said communication endpoint into a communication endpoint context management registration message to be sent towards said second network entity for managing network user data.

According to further example embodiments, said unmanned aerial system service status initiated indication is a re-registration request for said communication endpoint to re-register.

According to further example embodiments, said re-registration request includes an indication to said communication endpoint that said unmanned aerial system related services are enabled for said communication endpoint.

According to further example embodiments, said unmanned aerial system service status initiated indication is configuration update information indicative of that said unmanned aerial system related services are enabled for said communication endpoint.

According to a variation of the procedure shown in FIG. 7, exemplary details of the discovering operation (S72) are given, which are inherently independent from each other as such. Such exemplary discovering operation (S72) according to example embodiments may comprise an operation of receiving a trigger message indicative of that said unmanned aerial system related services are enabled for said communication endpoint.

According to a variation of the procedure shown in FIG. 7, exemplary details of the receiving operation (S71, receiving said information indicative of said unmanned aerial vehicle related capabilities of said communication endpoint) are given, which are inherently independent from each other as such. Such exemplary receiving operation (S71) according to example embodiments may comprise an operation of extracting said information indicative of said unmanned aerial vehicle related capabilities of said communication endpoint from a non-access stratum registration message received from said communication endpoint.

Figure 3:
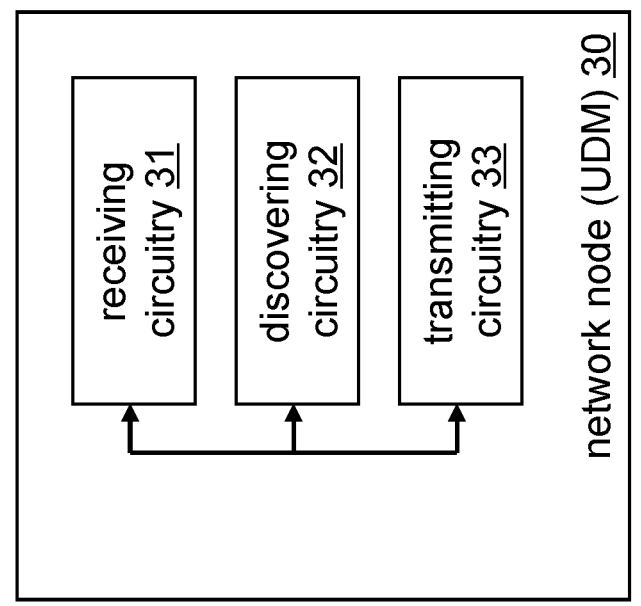
FIG. 3 is a block diagram illustrating an apparatus according to example embodiments.

FIG. 3 is a block diagram illustrating an apparatus according to example embodiments. The apparatus may be a network node or entity 30 (e.g. a second network entity for managing network user data, such as a unified data manager entity) comprising a receiving circuitry 31, a discovering

Figure 8:
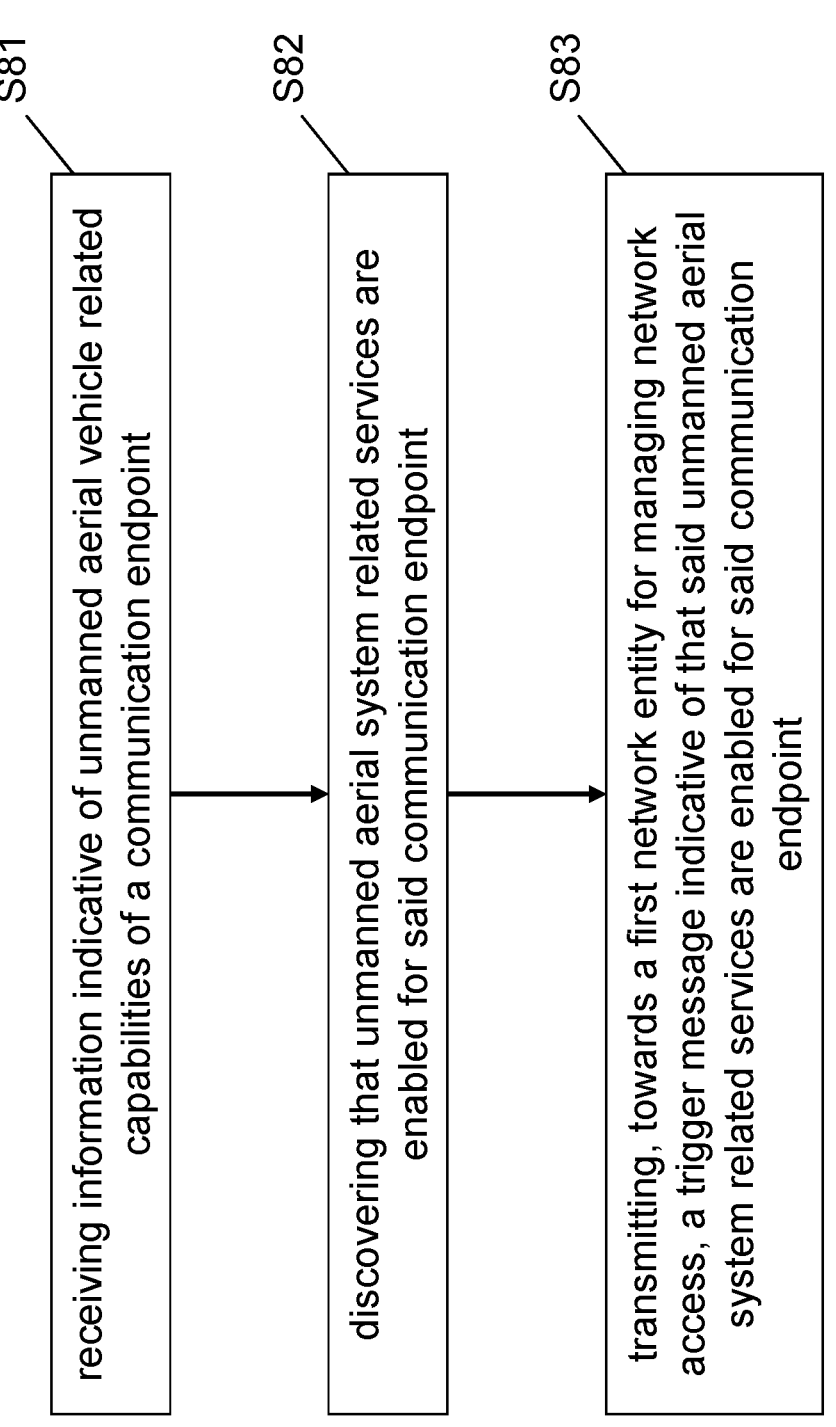
FIG. 8 is a schematic diagram of a procedure according to example embodiments.

8 circuitry 32, and a transmitting circuitry 33. The receiving circuitry 31 receives information indicative of unmanned aerial vehicle related capabilities of a communication endpoint. The discovering circuitry 32 discovers that unmanned aerial system related services are enabled for said communication endpoint. The transmitting circuitry 33 transmits, towards a first network entity for managing network access, a trigger message indicative of that said unmanned aerial system related services are enabled for said communication endpoint. FIG. 8 is a schematic diagram of a procedure according to example embodiments. The apparatus according to FIG. 3 may perform the method of FIG. 8 but is not limited to this method. The method of FIG. 8 may be performed by the apparatus of FIG. 3 but is not limited to being performed by this apparatus.

As shown in FIG. 8, a procedure according to example embodiments comprises an operation of receiving (S81) information indicative of unmanned aerial vehicle related capabilities of a communication endpoint, an operation of discovering (S82) that unmanned aerial system related services are enabled for said communication endpoint, and an operation of transmitting (S83), towards a first network entity for managing network access, a trigger message indicative of that said unmanned aerial system related services are enabled for said communication endpoint.

Figure 4:
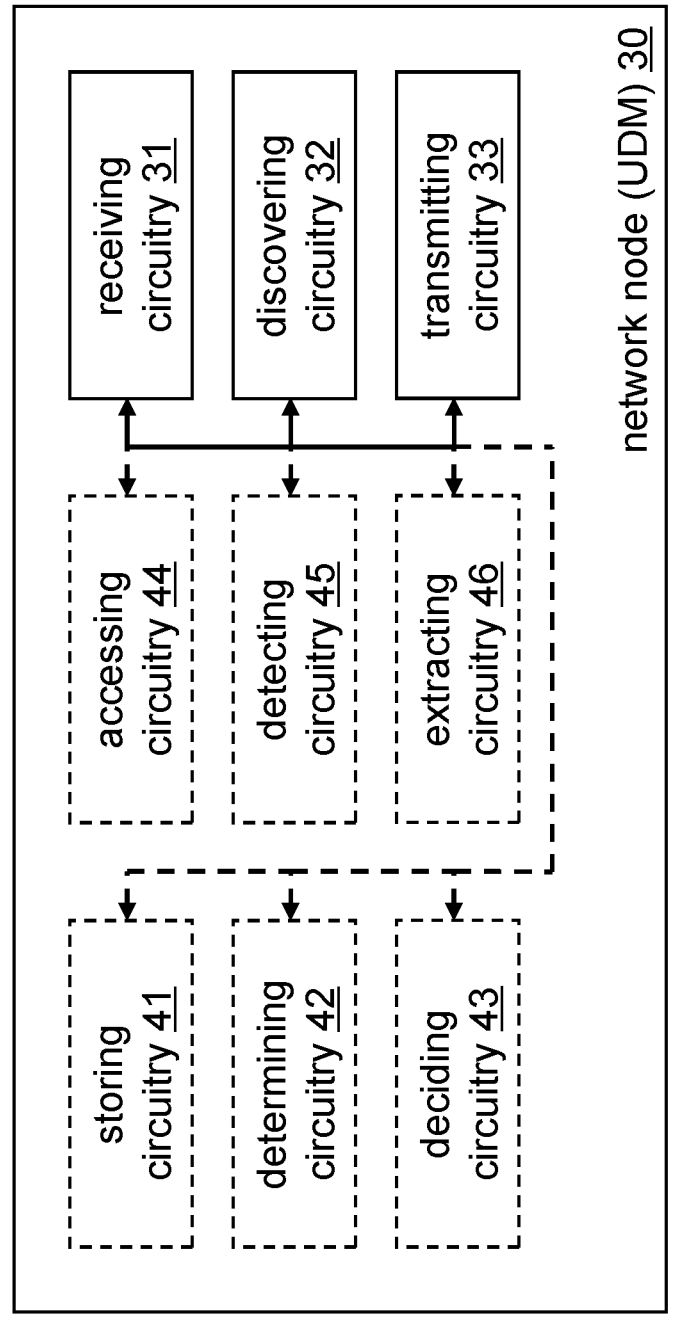
FIG. 4 is a block diagram illustrating an apparatus according to example embodiments.

FIG. 4 is a block diagram illustrating an apparatus according to example embodiments. In particular, FIG. 4 illustrates a variation of the apparatus shown in FIG. 3. The apparatus according to FIG. 4 may thus further comprise a storing circuitry 41, a determining circuitry 42, a deciding circuitry 43, an accessing circuitry 44, a detecting circuitry 45, and/or an extracting circuitry 46.

In an embodiment at least some of the functionalities of the apparatus shown in FIG. 3 (or 4) may be shared between two physically separate devices forming one operational entity. Therefore, the apparatus may be seen to depict the operational entity comprising one or more physically separate devices for executing at least some of the described processes.

According to a variation of the procedure shown in FIG. 8, exemplary additional operations are given, which are inherently independent from each other as such. According to such variation, an exemplary method according to example embodiments may comprise an operation of storing said information.

According to a variation of the procedure shown in FIG. 8, exemplary additional operations and exemplary details of the transmitting operation (S83) are given, which are inherently independent from each other as such.

According to such variation, an exemplary method according to example embodiments may comprise an operation of determining, based on said information, whether said unmanned aerial vehicle related capabilities of said communication endpoint exist or not. Further, such exemplary transmitting operation (S83) according to example embodiments may comprise an operation of deciding to transmit, towards said first network entity for managing network access, said trigger message, if said unmanned aerial vehicle related capabilities of said communication endpoint are determined to exist, and an operation of deciding to not transmit, towards said first network entity for managing network access, said trigger message, if said unmanned aerial vehicle related capabilities of said communication endpoint are determined to not exist.

According to a variation of the procedure shown in FIG. 8, exemplary details of the discovering operation (S82) are given, which are inherently independent from each other as such. Such exemplary discovering operation (S82) according to example embodiments may comprise an operation of accessing network user data related to said communication endpoint, and an operation of detecting that said network user data related to said communication endpoint indicate that that said unmanned aerial system related services are enabled for said communication endpoint.

According to a variation of the procedure shown in FIG. 8, exemplary details of the receiving operation (S81, receiving said information indicative of said unmanned aerial vehicle related capabilities of said communication endpoint) are given, which are inherently independent from each other as such. Such exemplary receiving operation (S81) according to example embodiments may comprise an operation of extracting said information indicative of said unmanned aerial vehicle related capabilities of said communication endpoint from a communication endpoint context management registration message received from said first network entity for managing network access.

Figure 5:
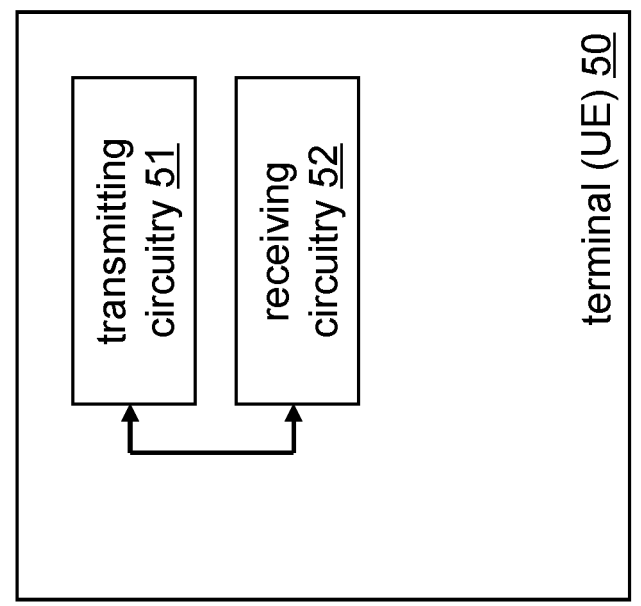
FIG. 5 is a block diagram illustrating an apparatus according to example embodiments.

FIG. 5 is a block diagram illustrating an apparatus according to example embodiments. The apparatus may be a terminal 50 (e.g. a communication endpoint, such as a user equipment, more specifically an unmanned aerial vehicle site user equipment) comprising a transmitting circuitry 51 and a receiving circuitry 52. The transmitting circuitry 51 transmits, towards a first network entity for managing network access, information indicative of unmanned aerial vehicle related capabilities of said communication endpoint. The receiving circuitry 52 receives, from said first network entity for managing network access, an unmanned aerial system service status initiated indication providing information in relation to a present registration of said communication endpoint to said network. FIG. 9 is a schematic diagram of a procedure according to example embodiments. The apparatus according to FIG. 5 may perform the method of FIG. 9 but is not limited to this method. The method of FIG. 9 may be performed by the apparatus of FIG. 5 but is not limited to being performed by this apparatus.

As shown in FIG. 9, a procedure according to example embodiments comprises an operation of transmitting (S91), towards a first network entity for managing network access, information indicative of unmanned aerial vehicle related capabilities of said communication endpoint, and an operation of receiving (S92), from said first network entity for managing network access, an unmanned aerial system service status initiated indication providing information in relation to a present registration of said communication endpoint to said network.

Figure 6:
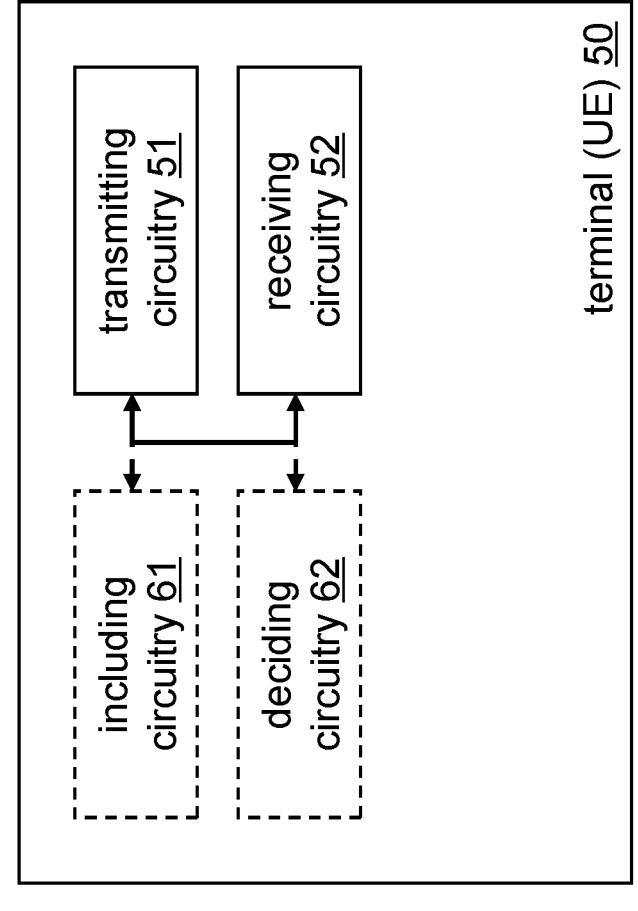
FIG. 6 is a block diagram illustrating an apparatus according to example embodiments.

FIG. 6 is a block diagram illustrating an apparatus according to example embodiments. In particular, FIG. 6 illustrates a variation of the apparatus shown in FIG. 5. The apparatus according to FIG. 6 may thus further comprise an including circuitry 61, and/or a deciding circuitry 62.

In an embodiment at least some of the functionalities of the apparatus shown in FIG. 5 (or 6) may be shared between two physically separate devices forming one operational entity. Therefore, the apparatus may be seen to depict the operational entity comprising one or more physically separate devices for executing at least some of the described processes.

According to a variation of the procedure shown in FIG. 8, exemplary details of the transmitting operation (S91, transmitting said information indicative of said unmanned aerial vehicle related capabilities of said communication endpoint) are given, which are inherently independent from each other as such. Such exemplary transmitting operation (S91) according to example embodiments may comprise an operation of including said information indicative of said unmanned aerial vehicle related capabilities of said communication endpoint into a non-access stratum registration message to be sent towards said first network entity for managing network access.

According to further example embodiments, said unmanned aerial system service status initiated indication is a re-registration request for said communication endpoint to re-register.

According to further example embodiments, said re-registration request includes an indication to said communication endpoint that said unmanned aerial system related services are enabled for said communication endpoint.

According to further example embodiments, said unmanned aerial system service status initiated indication is configuration update information indicative of that said unmanned aerial system related services are enabled for said communication endpoint.

According to a variation of the procedure shown in FIG. 9, exemplary additional operations are given, which are inherently independent from each other as such. According to such variation, an exemplary method according to example embodiments may comprise an operation of deciding, based on a result of said receiving, on re-registration utilizing a civil aviation authority related unmanned aerial vehicle identifier.

Example embodiments outlined and specified above are explained below in more specific terms.

Figure 10:
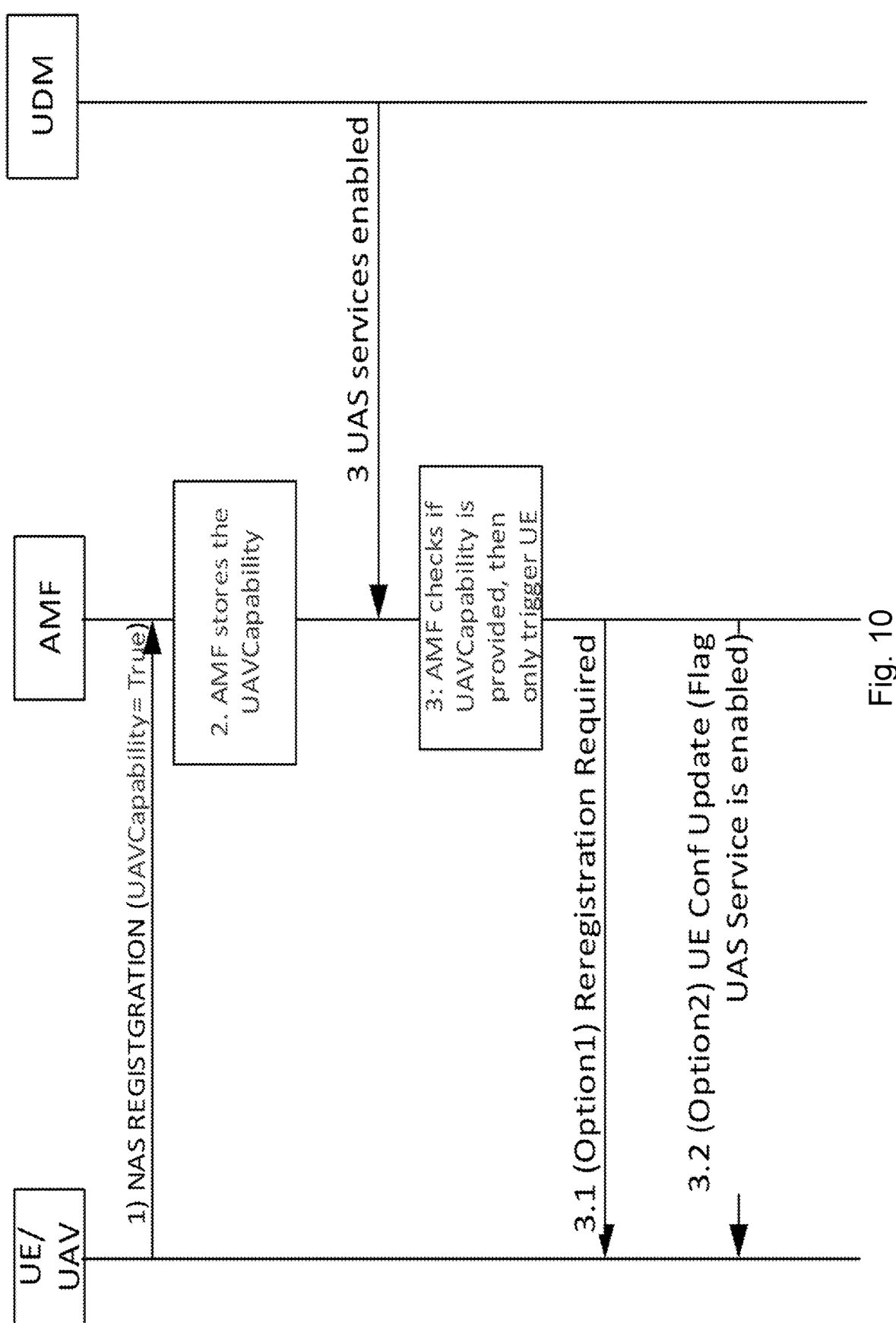
FIG. 10 shows a schematic diagram of signaling sequences according to example embodiments.

FIG. 10 shows a schematic diagram of signaling sequences according to example embodiments, and in particular illustrates an example procedure of an AMF based approach.

According to example embodiments, in a step 1 of FIG. 10, the UE provides UAV capability ("UAVCapability") to the AMF.

In particular, the UE may provide an indication to the network that it supports UAV features (e.g. "UAVCapability", or "UAVCapability=true"). This feature/capability may be provided by the UE, when the UE has the UAV functionality available.

According to example embodiments, the UE may indicate this capability as a part of a NAS REGISTRATION message.

According to example embodiments, in a step 2 of FIG. 10, the network stores the UAV capability.

In particular, the AMF may store the UAV capability in the UE context.

According to example embodiments, in a step 3 of FIG. 10 (UDM side), when UDM subscription of the UE is updated and aerial subscription is enabled, then the UDM sends a trigger to the AMF about that the UAS services are enabled.

Further, according to example embodiments, in a step 3 of FIG. 10 (AMF side), based on this notification or trigger from the UDM, the AMF may check whether the UE has provided the UAV capability, and if so, then the AMF informs the UE about the new situation. On the other hand, if the UE has not provided the UAVCapability or UAVCapability is provided with "value=False" (i.e., UE has not provided the UAV capability), then the AMF does not inform the UE about the new situation, assuming that the UAV functionality is not supported at the UE, or, in other words, the UE is not used with a UAV.

According to example embodiments, two options are provided for informing or not informing the UE as mentioned above, as explained with respect to steps 3.1 and 3.2 of FIG. 10.

In particular, according to example embodiments, in a step 3.1 of FIG. 10, an explicit request for re-registration is utilized (re-registration based).

In detail, based on the notification or trigger from the UDM, the AMF may check whether the UE has provided the UAV capability, and if so, then the AMF triggers the UE with re-registration required (defined in TS 29.503, TS 23.502). The UE may then (perform a de-registration and then) register again by providing the CAA-Level UAV ID to access the UAS services. On the other hand, if the UE has not provided the UAVCapability or UAVCapability is provided with "value=False" (i.e., UE has not provided the UAV capability), then the AMF does not trigger the UE (the re-registration of the UE), assuming that the UAV functionality is not supported at the UE, or, in other words, the UE is not used with a UAV.

According to example embodiments, in a step 3.2 of FIG. 10 (as an alternative to step 3.1 of FIG. 10), a configuration update is utilized (UCU based).

In detail, based on the notification or trigger from the UDM, the AMF may check whether the UE has provided the UAV capability, and if so, then the AMF triggers the UE configuration update procedure, informing the UE that UAS services are enabled. The UE may then perform a de-registration and then register again by providing the CAA-Level UAV ID to access the UAS services. On the other hand, if the UE has not provided the UAVCapability or UAVCapability is provided with "value=False" (i.e., UE has not provided the UAV capability), then the AMF does not trigger the UE configuration update procedure, assuming that the UAV functionality is not supported at the UE, or, in other words, the UE is not used with a UAV.

FIG. 11 shows a schematic diagram of signaling sequences according to example embodiments, and in particular illustrates an example procedure of an UDM based approach.

According to example embodiments, in a step 1 of FIG. 11, the UE provides UAV capability ("UAVCapability") to the AMF.

In particular, the UE may provide an indication to the network that it supports UAV features (e.g. "UAVCapability", or "UAVCapability=true"). This feature/capability may be provided by the UE, when the UE has the UAV functionality available.

According to example embodiments, the UE may indicate this capability as a part of a NAS REGISTRATION message.

According to example embodiments, in a step 2 of FIG. 11, the AMF passes the UAV capability to the UDM According to example embodiments, in a step 3 of FIG. 11, the UDM stores the UAV capability. The UDM may store the UAV capability in a unified data repository (UDR) as a part of AMF registration data.

According to example embodiments, in a step 4 of FIG. 11, when UAS services are enabled, the UDM checks whether the UE supports UAV capability or not.

According to example embodiments, in a step 5 of FIG. 11, if the UE supports UAV capability, then the UDM sends a trigger to the AMF about that the UAS services are enabled. On the other hand, if the UE does not support UAV capability, then the UDM does not sends the trigger to the AMF about that the UAS services are enabled.

Further, according to example embodiments, in a step 6 of FIG. 11, based on this notification or trigger from the UDM, the AMF informs the UE about the new situation.

According to example embodiments, two options are provided for informing or not informing the UE as mentioned above. These two options are similar to those as explained with respect to steps 3.1 and 3.2 of FIG. 10.

In particular, according to example embodiments, as one option, an explicit request for re-registration is utilized (re-registration based).

In detail, based on the notification or trigger from the UDM, the AMF triggers the UE with re-registration required (defined in TS 29.503, TS 23.502). The UE may then (perform a de-registration and then) register again by providing the CAA-Level UAV ID to access the UAS services.

Further, according to example embodiments, as another, alternative option, a configuration update is utilized (UCU based).

In detail, based on the notification or trigger from the UDM, the AMF triggers the UE configuration update procedure, informing the UE that UAS services are enabled. The UE may then perform a de-registration and then register again by providing the CAA-Level UAV ID to access the UAS services.

FIG. 12 shows a schematic diagram of signaling sequences according to example embodiments, and in particular illustrates example aspects of USS UAV authorization/authentication in a registration procedure.

In particular, FIG. 12 illustrates a context in which example embodiments may be specifically regulated.

In detail, according to such specific regulation according to example embodiments, it is addressed that currently (e.g. according to TS 23.256), if the UE used with a UAV does not have aerial services enabled, then the AMF rejects the registration request with indication that "UAS services are not allowed". This triggers the UAV to not re-register including the CAA-Level UAV ID.

Namely, if UUAA is configured in the AMF to be performed during 5GS registration and the UE has provided a CAA-Level UAV ID in the registration request in step 1 of FIG. 12, but the UE does not have an aerial subscription in the UE subscription data retrieved from the UDM in step 2 of FIG. 12, then the AMF rejects the registration with an indication that UAS services are is not allowed which triggers the UAV to not re-register for aerial services and ensures that the UE is not allowed to access any aerial service.

If the UE wants to use the 3GPP network for other services (i.e. non-UAS services), the UE may then register to the network without providing the CAA-Level UAV ID, which will mean that the 3GPP system will allow the UE to register as a normal UE.

It is not clear from the above outlined situation addressed by such specific regulation according to example embodiments when and how the UE determines to re-register for aerial services (i.e. include CAA-Level UAV ID in the registration request). Since the network had rejected the registration request with an indication that "UAS services are not allowed", which triggers the UAV to not re-register for UAS aerial services, currently, the UE will never again try to access the network using CAA-Level UAV ID. Namely, a UE that has registered into the network as a normal UE due to an earlier rejection of registration for aerial services (i.e. including CAA-Level UAV ID) with the reason "UAS services are not allowed" cannot determine when it can again access the aerial services, i.e., re-register with CAA-Level UAV ID.

When the UE subscription is changed to enable "Aerial services", the network should notify the UE to re-register with CAA-Level UAV ID, so that the UE can access the UAS services. However, since the UE is registered as a normal UE (without providing CAA-Level UAV ID), the network cannot determine whether the UE is used with a UAV. This may lead to the network triggering re-registration of UEs that are not used with UAV as well, or to the network not triggering re-registration of UEs at all.

According to such specific regulation according to example embodiments, the above-outlined current behavior is to be changed/updated as briefly summarized below.

First, the UE includes a UAV capability information to indicate whether it is used with a UAV.

Second, the AMF stores this UAV capability information in the UE context.

Third, when the UE subscription is changed to enable "Aerial Subscription" in the UDM, the AMF gets notified thereof, and subsequently, based on the UAV capability indication in UE context, the AMF triggers the UE to re-register with CAA-Level UAV ID.

A current UUAA-MM procedure is optional and triggered for a UE that requires UAV authentication and authorization by a USS when registering with 5GS. The UUAA-MM procedure is triggered by the AMF. UUAA-MM is triggered during the UE Registration based on the local network policy, if the UE has an Aerial UE subscription with the 5GS and if the UE has provided the CAA-Level UAV ID of the UAV in the Registration Request, or when the USS that authenticated the UAV triggers a re-authentication.

According to this current UUAA-MM procedure, the UE is authenticated and authorized by USS using a CAA-Level UAV ID and credentials associated to the CAA-Level UAV ID, different from the 3GPP subscription credentials (e.g. SUPI and credentials used for PLMN access). During the UUAA-MM procedure, the AMF communicates with the USS via a UAS NF and forwards authentication messages transparently between the UE and UAS NF.

According to this current UUAA-MM procedure, the UAS NF stores the UAV UEs UUAA context after successful UUAA procedure. The UUAA context may be stored in the UDSF or may be stored locally in the UAS NF depending on deployments. The UAS NF also creates an implicit subscription for notification towards the AMF after the successful UUAA procedure. This notification is used by the UAS NF to trigger re-authentication, update authorization data or revoke authorization of the UAV, upon receipt of such request from the USS.

According to the specific regulation according to example embodiments, the above-outlined current behavior is to be changed/updated as explained below with reference to FIG. 12.

In a step 1 of the procedure illustrated in FIG. 12, the UE sends a Registration request message and, if configured with one, it provides a CAA-Level UAV ID of the UAV and optionally a USS address when registering for UAS services. The UE may also include a UAV Capability information to indicate to the network that the UE supports UAV functionality.

In a step 2 of the procedure illustrated in FIG. 12, if primary authentication is requested (e.g. if this is an initial Registration), the AMF invokes primary authentication. The AMF may invoke it as described in step 9 in FIG. 4.2.2.2.2-1 of TS 23.502. Subsequently, the AMF retrieves UE subscription data from the UDM. The AMF may retrieve the UE subscription data from the UDM as described in step 14 in FIG. 4.2.2.2.2-1 of TS 23.502.

In a step 3 of the procedure illustrated in FIG. 12, the AMF determines whether to perform UUAA-MM for the UAV. The AMF decides to perform UUAA if:

a) the UE has a valid Aerial UE subscription information;

b) UUAA is to be performed during Registration according to local operator policy;

c) there is no successful UUAA result from a previous UUAA-MM procedure;

d) the UE has provided a CAA-Level UAV ID.

The AMF does not perform UUAA-MM for non-3GPP access and ensures that the UE is not allowed to access any aerial services in non-3GPP access by rejecting PDU session establishment requests for aerial services (identified by DNN/S-NSSAI).

In a step 4 of the procedure illustrated in FIG. 12, if the AMF determines in step 3 of FIG. 12 that a UUAA-MM is to be performed, the AMF includes a pending UUAA-MM indication in the Registration Accept message. The AMF stores in the UE context that a UUAA is pending. The UE waits for completion of the UUAA-MM procedure without attempting to register for UAS services or to establish user plane connectivity to USS or UAV-C.

If the AMF determines that UUAA is not to be performed during this Registration procedure, UUAA may be triggered during PDU Session Establishment later on.

If UUAA is configured in the AMF to be performed during 5GS registration and the UE has provided a CAA-Level UAV ID in the registration request in step 1 of FIG. 12, but the UE does not have an aerial subscription in the UE subscription data retrieved from the UDM in step 2 of FIG. 12, then the AMF rejects the registration with an indication that UAS services are not allowed, which triggers the UAV to not re-register for aerial services and ensures that the UE is not allowed to access any aerial service. The UE may then register without providing CAA-Level UAV ID and include UAV Capability information set to TRUE in the registration request to indicate to the network that the UE supports a UAV functionality. The AMF stores the UAV Capability information in the UE context. When the Aerial Subscription is enabled for the UE in the UDM, the UDM sends a notification to the AMF. The AMF then triggers a Network-initiated Deregistration procedure with Deregistration type set to Re-registration, if the UAV Capability information in the UE context is set to TRUE. The Network-initiated Deregistration procedure triggered by the AMF may follow the processing as described in clause 4.2.2.3.3 of TS 23.502 with Deregistration type set to Re-registration. The UE may then re-register including the CAA-Level UAV ID at the end of the Deregistration procedure.

If UUAA is configured in the AMF to be performed during 5GS registration, the UE did not provide a CAA-Level UAV ID in the registration request in step 1 of FIG. 12, but UE has aerial subscription in the UE subscription data retrieved from UDM in step 2 of FIG. 12, then the AMF accepts the registration and ensures that the UE is not allowed to access any aerial service by storing in the UE context that 'UUAA-MM has FAILED', and further rejecting PDU session establishment requests for aerial services (identified by DNN/S-NSSAI). At a later point in time, if the UE wants to use the aerial services by providing the CAA-Level UAV ID later on via UUAA-MM procedure, then the UE first performs UE-initiated Deregistration procedure followed by an Initial Registration to the 5GS including the CAA-Level UAV ID in the registration request. The UE-initiated Deregistration procedure performed by the UE may follow the processing as explained in clause 4.2.2.3.2 of TS 23.502.

In a step 5 of the procedure illustrated in FIG. 12, if the UE indicates its support for Network Slice-Specific Authentication and Authorization (NSSAA) procedure in the UE MM Core Network Capability, and if the UE includes Requested S-NSSAI in Registration Request which is subject to NSSAA, however, the Requested S-NSSAI has not been successfully authenticated, a NSSAA procedure is executed. The NSSAA procedure may follow the processing as described in clause 4.2.2.2.2 of TS 23.502.

In a step 6 of the procedure illustrated in FIG. 12, if required based on step 3 determination, and if the S-NSSAI that is associated with the UAS services is part of the Allowed NSSAI, a UUAA-MM procedure is executed at this step. The UUAA-MM procedure may follow the processing described in clause 5.2.2.2 of TS 23.256. Once the UUAA-MM procedure is successfully completed for the UAV, the AMF stores a successful UUAA result and updates the UE context indicating that UUAA is no longer pending and with an optional authorized CAA-Level UAV ID received from the USS, and triggers a UE Configuration Update procedure to deliver the UUAA result and the UUAA Authorization Payload containing UAV configuration to the UE. The UE Configuration Update procedure triggered by the AMF may follow the processing described in clause 4.2.4.2 of TS 23.502. The AMF may also deliver the authorized CAA-Level UAV ID that it may have received from the USS.

If UUAA fails, based on local network policy, the AMF may decide to deregister the UE with an appropriate cause value in the De-Registration Request message, or keep the UE-registered with a failure UUAA result in UE context and ensures that the UE is not allowed to access any aerial service based on the DNN/S-NSSAI value. This may follow the processing as described in step 7 of clause 5.2.2.2 of TS 23.256. If the UE is de-registered, the UE may re-attempt to re-register without including the CAA-level UAV ID.

The above-described procedures and functions may be implemented by respective functional elements, processors, or the like, as described below.

In the foregoing exemplary description of the network entity, only the units that are relevant for understanding the principles of the disclosure have been described using functional blocks. The network entity may comprise further units that are necessary for its respective operation. However, a description of these units is omitted in this specification. The arrangement of the functional blocks of the devices is not construed to limit the disclosure, and the functions may be performed by one block or further split into sub-blocks.

When in the foregoing description it is stated that the apparatus, i.e. network node or entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 13:
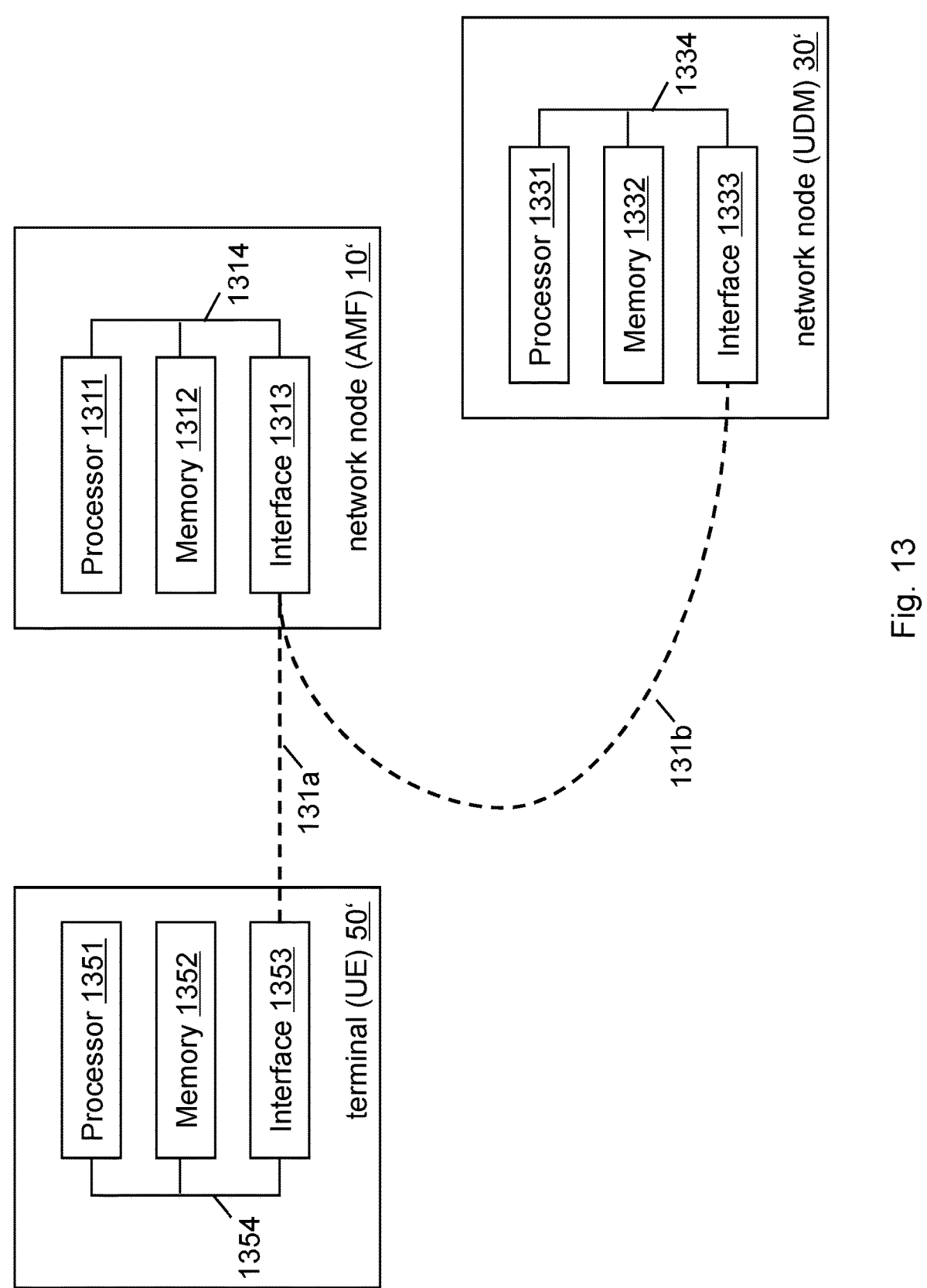
FIG. 13 is a block diagram alternatively illustrating apparatuses according to example embodiments.

In FIG. 13, an alternative illustration of apparatuses according to example embodiments is depicted. As indicated in FIG. 13, according to example embodiments, the apparatus (network node) 10' (corresponding to the network node 10) comprises a processor 1311, a memory 1312 and an interface 1313, which are connected by a bus 1314 or the like. Further, according to example embodiments, the apparatus (network node) 30' (corresponding to the network node 30) comprises a processor 1331, a memory 1332 and an interface 1333, which are connected by a bus 1334 or the like. Further, according to example embodiments, the apparatus (terminal) 50' (corresponding to the terminal 50) comprises a processor 1351, a memory 1352 and an interface 1353, which are connected by a bus 1354 or the like. The apparatuses may be connected via links 131a, 131b, respectively.

The processor 1311/1331/1351 and/or the interface 1313/1333/1353 may also include a modem or the like to facilitate communication over a (hardwire or wireless) link, respectively. The interface 1313/1333/1353 may include a suitable transceiver coupled to one or more antennas or communication means for (hardwire or wireless) communications with the linked or connected device(s), respectively. The interface 1313/1333/1353 is generally configured to communicate with at least one other apparatus, i.e. the interface thereof.

The memory 1312/1332/1352 may store respective programs assumed to include program instructions or computer program code that, when executed by the respective processor, enables the respective electronic device or apparatus to operate in accordance with the example embodiments.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to example embodiments, an apparatus representing the network node 10 (e.g. a first network entity for managing network access) comprises at least one processor 1311, at least one memory 1312 including computer program code, and at least one interface 1313 configured for communication with at least another apparatus. The processor (i.e. the at least one processor 1311, with the at least one memory 1312 and the computer program code) is configured to perform receiving information indicative of unmanned aerial vehicle related capabilities of a communication endpoint (thus the apparatus comprising corresponding means for receiving), to perform discovering that unmanned aerial system related services are enabled for said communication endpoint (thus the apparatus comprising corresponding means for discovering), and to perform transmitting, towards said communication endpoint, an unmanned aerial system service status initiated indication providing information in relation to a present registration of said communication endpoint to a network (thus the apparatus comprising corresponding means for transmitting).

According to example embodiments, an apparatus representing the network node 30 (e.g. a second network entity for managing network user data) comprises at least one processor 1331, at least one memory 1332 including computer program code, and at least one interface 1333 configured for communication with at least another apparatus. The processor (i.e. the at least one processor 1331, with the at least one memory 1332 and the computer program code) is configured to perform receiving information indicative of unmanned aerial vehicle related capabilities of a communication endpoint (thus the apparatus comprising corresponding means for receiving), to perform discovering that unmanned aerial system related services are enabled for said communication endpoint (thus the apparatus comprising corresponding means for discovering), and to perform transmitting, towards a first network entity for managing network access, a trigger message indicative of that said unmanned aerial system related services are enabled for said communication endpoint (thus the apparatus comprising corresponding means for transmitting).

According to example embodiments, an apparatus representing the terminal 50 (e.g. a communication endpoint) comprises at least one processor 1351, at least one memory 1352 including computer program code, and at least one interface 1353 configured for communication with at least another apparatus. The processor (i.e. the at least one processor 1351, with the at least one memory 1352 and the computer program code) is configured to perform transmitting, towards a first network entity for managing network access, information indicative of unmanned aerial vehicle related capabilities of said communication endpoint (thus the apparatus comprising corresponding means for transmitting), and to perform receiving, from said first network entity for managing network access, an unmanned aerial system service status initiated indication providing information in relation to a present registration of said communication endpoint to said network (thus the apparatus comprising corresponding means for receiving).

For further details regarding the operability/functionality of the individual apparatuses, reference is made to the above description in connection with any one of FIGS. 1 to 12, respectively.

Further examples are described below:

Example 1. A method of a first network entity for managing network access comprising receiving information indicative of unmanned aerial vehicle related capabilities of a communication endpoint, discovering that unmanned aerial system related services are enabled for said communication endpoint, and transmitting, towards said communication endpoint, an unmanned aerial system service status initiated indication providing information in relation to a present registration of said communication endpoint to a network.

Example 2. The method according to Example 1, further comprising storing said information.

Example 3. The method according to Example 1 or 2, further comprising determining, based on said information, whether said unmanned aerial vehicle related capabilities of said communication endpoint exist or not, and in relation to said transmitting, the method further comprises deciding to transmit, towards said communication endpoint, said unmanned aerial system service status initiated indication, if said unmanned aerial vehicle related capabilities of said communication endpoint are determined to exist, and deciding to not transmit, towards said communication endpoint, said unmanned aerial system service status initiated indication, if said unmanned aerial vehicle related capabilities of said communication endpoint are determined to not exist.

Example 4. The method according to Example 1, further comprising transmitting said received information indicative of said unmanned aerial vehicle related capabilities of said communication endpoint towards a second network entity for managing network user data.

Example 5. The method according to Example 4, wherein in relation to said transmitting said received information indicative of said unmanned aerial vehicle related capabilities of said communication endpoint towards said second network entity for managing network user data, the method further comprises including said received information indicative of said unmanned aerial vehicle related capabilities of said communication endpoint into a communication endpoint context management registration message to be sent towards said second network entity for managing network user data.

Example 6. The method according to any of Examples 1 to 5, wherein said unmanned aerial system service status initiated indication is a re-registration request for said communication endpoint to re-register.

Example 7. The method according to Example 6, wherein said re-registration request includes an indication to said communication endpoint that said unmanned aerial system related services are enabled for said communication endpoint.

Example 8. The method according to any of Examples 1 to 5, wherein said unmanned aerial system service status initiated indication is configuration update information indicative of that said unmanned aerial system related services are enabled for said communication endpoint.

Example 9. The method according to any of Examples 1 to 8, wherein in relation to said discovering, the method further comprises receiving a trigger message indicative of that said unmanned aerial system related services are enabled for said communication endpoint.

Example 10. The method according to any of Examples 1 to 9, wherein in relation to said receiving said information indicative of said unmanned aerial vehicle related capabilities of said communication endpoint, the method further comprises extracting said information indicative of said unmanned aerial vehicle related capabilities of said communication endpoint from a non-access stratum registration message received from said communication endpoint.

Example 11. A method of a second network entity for managing network user data comprising receiving information indicative of unmanned aerial vehicle related capabilities of a communication endpoint, discovering that unmanned aerial system related services are enabled for said communication endpoint, and transmitting, towards a first network entity for managing network access, a trigger message indicative of that said unmanned aerial system related services are enabled for said communication endpoint.

Example 12. The method according to Example 11, further comprising storing said information.

Example 13. The method according to Example 11 or 12, further comprising determining, based on said information, whether said unmanned aerial vehicle related capabilities of said communication endpoint exist or not, and in relation to said transmitting, the method further comprises deciding to transmit, towards said first network entity for managing network access, said trigger message, if said unmanned aerial vehicle related capabilities of said communication endpoint are determined to exist, and deciding to not transmit, towards said first network entity for managing network access, said trigger message, if said unmanned aerial vehicle related capabilities of said communication endpoint are determined to not exist.

Example 14. The method according to any of Examples 11 to 13, wherein in relation to said discovering, the method further comprises accessing network user data related to said communication endpoint, and detecting that said network user data related to said communication endpoint indicate that that said unmanned aerial system related services are enabled for said communication endpoint.

Example 15. The method according to any of Examples 11 to 14, wherein in relation to said receiving said information indicative of said unmanned aerial vehicle related capabilities of said communication endpoint, the method further comprises extracting said information indicative of said unmanned aerial vehicle related capabilities of said communication endpoint from a communication endpoint context management registration message received from said first network entity for managing network access.

Example 16. A method of a communication endpoint, for registering the communication endpoint to a network, the method comprising transmitting, towards a first network entity for managing network access, information indicative of unmanned aerial vehicle related capabilities of said communication endpoint, and receiving, from said first network entity for managing network access, an unmanned aerial system service status initiated indication providing information in relation to a present registration of said communication endpoint to said network.

Example 17. The method according to Example 16, wherein in relation to said transmitting said information indicative of said unmanned aerial vehicle related capabilities of said communication endpoint, the method further comprises including said information indicative of said unmanned aerial vehicle related capabilities of said communication endpoint into a non-access stratum registration message to be sent towards said first network entity for managing network access.

Example 18. The method according to Example 16 or 17, wherein said unmanned aerial system service status initiated indication is a re-registration request for said communication endpoint to re-register.

Example 19. The method according to Example 18, wherein said re-registration request includes an indication to said communication endpoint that said unmanned aerial system related services are enabled for said communication endpoint.

Example 20. The method according to Example 16 or 17, wherein said unmanned aerial system service status initiated indication is configuration update information indicative of that said unmanned aerial system related services are enabled for said communication endpoint.

Example 21. The method according to any of Examples 16 to 20, further comprising deciding, based on a result of said receiving, on re-registration utilizing a civil aviation authority related unmanned aerial vehicle identifier.

Example 22. An apparatus of a first network entity for managing network access comprising receiving circuitry configured to receive information indicative of unmanned aerial vehicle related capabilities of a communication endpoint, discovering circuitry configured to discover that unmanned aerial system related services are enabled for said communication endpoint, and transmitting circuitry configured to transmit, towards said communication endpoint, an unmanned aerial system service status initiated indication providing information in relation to a present registration of said communication endpoint to a network.

Example 23. The apparatus according to Example 22, further comprising storing circuitry configured to store said information.

Example 24. The apparatus according to Example 22 or 23, further comprising determining circuitry configured to determine, based on said information, whether said unmanned aerial vehicle related capabilities of said communication endpoint exist or not, and deciding circuitry configured to decide to transmit, towards said communication endpoint, said unmanned aerial system service status initiated indication, if said unmanned aerial vehicle related capabilities of said communication endpoint are determined to exist, and to decide to not transmit, towards said communication endpoint, said unmanned aerial system service status initiated indication, if said unmanned aerial vehicle related capabilities of said communication endpoint are determined to not exist.

Example 25. The apparatus according to Example 22, further comprising transmitting circuitry configured to transmit said received information indicative of said unmanned aerial vehicle related capabilities of said communication endpoint towards a second network entity for managing network user data.

Example 26. The apparatus according to Example 25, further comprising including circuitry configured to include said received information indicative of said unmanned aerial vehicle related capabilities of said communication endpoint into a communication endpoint context management registration message to be sent towards said second network entity for managing network user data.

Example 27. The apparatus according to any of Examples 22 to 26, wherein said unmanned aerial system service status initiated indication is a re-registration request for said communication endpoint to re-register.

Example 28. The apparatus according to Example 27, wherein said re-registration request includes an indication to said communication endpoint that said unmanned aerial system related services are enabled for said communication endpoint.

Example 29. The apparatus according to any of Examples 22 to 26, wherein said unmanned aerial system service status initiated indication is configuration update information indicative of that said unmanned aerial system related services are enabled for said communication endpoint.

Example 30. The apparatus according to any of Examples 22 to 29, further comprising receiving circuitry configured to receive a trigger message indicative of that said unmanned aerial system related services are enabled for said communication endpoint.

Example 31. The apparatus according to any of Examples 22 to 30, further comprising extracting circuitry configured to extract said information indicative of said unmanned aerial vehicle related capabilities of said communication endpoint from a non-access stratum registration message received from said communication endpoint.

Example 32. An apparatus of a second network entity for managing network user data comprising receiving circuitry configured to receive information indicative of unmanned aerial vehicle related capabilities of a communication endpoint, discovering circuitry configured to discover that unmanned aerial system related services are enabled for said communication endpoint, and transmitting circuitry configured to transmit, towards a first network entity for managing network access, a trigger message indicative of that said unmanned aerial system related services are enabled for said communication endpoint.

Example 33. The apparatus according to Example 32, further comprising storing circuitry configured to store said information.

Example 34. The apparatus according to Example 32 or 33, further comprising determining circuitry configured to determine, based on said information, whether said unmanned aerial vehicle related capabilities of said communication endpoint exist or not, and deciding circuitry configured to decide to transmit, towards said first network entity for managing network access, said trigger message, if said unmanned aerial vehicle related capabilities of said communication endpoint are determined to exist, and to decide to not transmit, towards said first network entity for managing network access, said trigger message, if said unmanned aerial vehicle related capabilities of said communication endpoint are determined to not exist.

Example 35. The apparatus according to any of Example 32 to 34, further comprising accessing circuitry configured to access network user data related to said communication endpoint, and detecting circuitry configured to detect that said network user data related to said communication endpoint indicate that that said unmanned aerial system related services are enabled for said communication endpoint.

Example 36. The apparatus according to any of Examples 32 to 35, further comprising extracting circuitry configured to extract said information indicative of said unmanned aerial vehicle related capabilities of said communication endpoint from a communication endpoint context management registration message received from said first network entity for managing network access.

Example 37. An apparatus of a communication endpoint, for registering the communication endpoint to a network, the apparatus comprising transmitting circuitry configured to transmit, towards a first network entity for managing network access, information indicative of unmanned aerial vehicle related capabilities of said communication endpoint, and receiving circuitry configured to receive, from said first network entity for managing network access, an unmanned aerial system service status initiated indication providing information in relation to a present registration of said communication endpoint to said network.

Example 38. The apparatus according to Example 37, further comprising including circuitry configured to include said information indicative of said unmanned aerial vehicle related capabilities of said communication endpoint into a non-access stratum registration message to be sent towards said first network entity for managing network access.

Example 39. The apparatus according to Example 37 or 38, wherein said unmanned aerial system service status initiated indication is a re-registration request for said communication endpoint to re-register.

Example The apparatus according to Example 39, wherein said re-registration request includes an indication to said communication endpoint that said unmanned aerial system related services are enabled for said communication endpoint.

Example 41. The apparatus according to Example 37 or 38, wherein said unmanned aerial system service status initiated indication is configuration update information indicative of that said unmanned aerial system related services are enabled for said communication endpoint.

Example 42. The apparatus according to any of Examples 37 to 41, further comprising deciding circuitry configured to decide, based on a result of said receiving, on re-registration utilizing a civil aviation authority related unmanned aerial vehicle identifier.

Example 43. An apparatus of a first network entity for managing network access comprising at least one processor, at least one memory including computer program code, and at least one interface configured for communication with at least another apparatus, the at least one processor, with the at least one memory and the computer program code, being configured to cause the apparatus to perform:

receiving information indicative of unmanned aerial vehicle related capabilities of a communication endpoint, discovering that unmanned aerial system related services are enabled for said communication endpoint, and transmitting, towards said communication endpoint, an unmanned aerial system service status initiated indication providing information in relation to a present registration of said communication endpoint to a network.

Example 44. The apparatus according to Example 43, wherein the at least one processor, with the at least one memory and the computer program code, being configured to cause the apparatus to perform:

storing said information.

Example 45. The apparatus according to Example 43 or 44, wherein the at least one processor, with the at least one memory and the computer program code, being configured to cause the apparatus to perform:

determining, based on said information, whether said unmanned aerial vehicle related capabilities of said communication endpoint exist or not, and in relation to said transmitting, the at least one processor, with the at least one memory and the computer program code, being configured to cause the apparatus to perform:

deciding to transmit, towards said communication endpoint, said unmanned aerial system service status initiated indication, if said unmanned aerial vehicle related capabilities of said communication endpoint are determined to exist, and deciding to not transmit, towards said communication endpoint, said unmanned aerial system service status initiated indication, if said unmanned aerial vehicle related capabilities of said communication endpoint are determined to not exist.

Example 46. The apparatus according to Example 43, wherein the at least one processor, with the at least one memory and the computer program code, being configured to cause the apparatus to perform:

transmitting said received information indicative of said unmanned aerial vehicle related capabilities of said communication endpoint towards a second network entity for managing network user data.

Example 47. The apparatus according to Example 46, wherein in relation to said transmitting said received information indicative of said unmanned aerial vehicle related capabilities of said communication endpoint towards said second network entity for managing network user data, the at least one processor, with the at least one memory and the computer program code, being configured to cause the apparatus to perform:

including said received information indicative of said unmanned aerial vehicle related capabilities of said communication endpoint into a communication endpoint context management registration message to be sent towards said second network entity for managing network user data.

Example 48. The apparatus according to any of Examples 43 to 47, wherein said unmanned aerial system service status initiated indication is a re-registration request for said communication endpoint to re-register.

Example 49. The apparatus according to Example 48, wherein said re-registration request includes an indication to said communication endpoint that said unmanned aerial system related services are enabled for said communication endpoint.

Example 50. The apparatus according to any of Examples 43 to 47, wherein said unmanned aerial system service status initiated indication is configuration update information indicative of that said unmanned aerial system related services are enabled for said communication endpoint.

Example 51. The apparatus according to any of Examples 43 to 50, wherein in relation to said discovering, the at least one processor, with the at least one memory and the computer program code, being configured to cause the apparatus to perform:

receiving a trigger message indicative of that said unmanned aerial system related services are enabled for said communication endpoint.

Example 52. The apparatus according to any of Examples 43 to 51, wherein in relation to said receiving said information indicative of said unmanned aerial vehicle related capabilities of said communication endpoint, the at least one processor, with the at least one memory and the computer program code, being configured to cause the apparatus to perform:

extracting said information indicative of said unmanned aerial vehicle related capabilities of said communication endpoint from a non-access stratum registration message received from said communication endpoint.

Example 53. An apparatus of a second network entity for managing network user data comprising at least one processor, at least one memory including computer program code, and at least one interface configured for communication with at least another apparatus, the at least one processor, with the at least one memory and the computer program code, being configured to cause the apparatus to perform:

receiving information indicative of unmanned aerial vehicle related capabilities of a communication endpoint, discovering that unmanned aerial system related services are enabled for said communication endpoint, and transmitting, towards a first network entity for managing network access, a trigger message indicative of that said unmanned aerial system related services are enabled for said communication endpoint.

Example 54. The apparatus according to Example 53, the at least one processor, with the at least one memory and the computer program code, being configured to cause the apparatus to perform:

storing said information.

Example 55. The apparatus according to Example 53 or 54, the at least one processor, with the at least one memory and the computer program code, being configured to cause the apparatus to perform:

determining, based on said information, whether said unmanned aerial vehicle related capabilities of said communication endpoint exist or not, and in relation to said transmitting, the at least one processor, with the at least one memory and the computer program code, being configured to cause the apparatus to perform:

deciding to transmit, towards said first network entity for managing network access, said trigger message, if said unmanned aerial vehicle related capabilities of said communication endpoint are determined to exist, and deciding to not transmit, towards said first network entity for managing network access, said trigger message, if said unmanned aerial vehicle related capabilities of said communication endpoint are determined to not exist.

Example 56. The apparatus according to any of Examples 53 to 55, wherein in relation to said discovering, the at least one processor, with the at least one memory and the computer program code, being configured to cause the apparatus to perform:

accessing network user data related to said communication endpoint, and detecting that said network user data related to said communication endpoint indicate that that said unmanned aerial system related services are enabled for said communication endpoint.

Example 57. The apparatus according to any of Examples 53 to 56, wherein in relation to said receiving said information indicative of said unmanned aerial vehicle related capabilities of said communication endpoint, the at least one processor, with the at least one memory and the computer program code, being configured to cause the apparatus to perform:

extracting said information indicative of said unmanned aerial vehicle related capabilities of said communication endpoint from a communication endpoint context management registration message received from said first network entity for managing network access.

Example 58. An apparatus of a communication endpoint, for registering the communication endpoint to a network, the apparatus comprising at least one processor, at least one memory including computer program code, and at least one interface configured for communication with at least another apparatus, the at least one processor, with the at least one memory and the computer program code, being configured to cause the apparatus to perform:

transmitting, towards a first network entity for managing network access, information indicative of unmanned aerial vehicle related capabilities of said communication endpoint, and receiving, from said first network entity for managing network access, an unmanned aerial system service status initiated indication providing information in relation to a present registration of said communication endpoint to said network.

Example 59. The apparatus according to Example 58, wherein in relation to said transmitting said information indicative of said unmanned aerial vehicle related capabilities of said communication endpoint, the at least one processor, with the at least one memory and the computer program code, being configured to cause the apparatus to perform:

including said information indicative of said unmanned aerial vehicle related capabilities of said communication endpoint into a non-access stratum registration message to be sent towards said first network entity for managing network access.

Example 60. The apparatus according to Examples 58 or 59, wherein said unmanned aerial system service status initiated indication is a re-registration request for said communication endpoint to re-register.

Example 61. The apparatus according to Example 60, wherein said re-registration request includes an indication to said communication endpoint that said unmanned aerial system related services are enabled for said communication endpoint.

Example 62. The apparatus according to Example 58 or 59, wherein said unmanned aerial system service status initiated indication is configuration update information indicative of that said unmanned aerial system related services are enabled for said communication endpoint.

Example 63. The apparatus according to any of Examples 58 to 62, the at least one processor, with the at least one memory and the computer program code, being configured to cause the apparatus to perform:

deciding, based on a result of said receiving, on re-registration utilizing a civil aviation authority related unmanned aerial vehicle identifier.

Example 64. A computer program product comprising computer-executable computer program code which, when the program is run on a computer, is configured to cause the computer to carry out the method according to any one of Examples 1 to 10, 11 to 15 or 16 to 21.

Example 65. The computer program product according to Example 64, wherein the computer program product comprises a computer-readable medium on which the computer-executable computer program code is stored, and/or wherein the program is directly loadable into an internal memory of the computer or a processor thereof.

For the purpose of the present disclosure as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present disclosure. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for improvement of terminal registration processing for aerial services. Such measures exemplarily comprise, e.g. at a first network entity for managing network access, receiving information indicative of unmanned aerial vehicle related capabilities of a communication endpoint, discovering that unmanned aerial system related services are enabled for said communication endpoint, and transmitting, towards said communication endpoint, an unmanned aerial system service status initiated indication providing information in relation to a present registration of said communication endpoint to a network.

Even though the disclosure is described above with reference to the examples according to the accompanying drawings, it is to be understood that the disclosure is not restricted thereto. Rather, it is apparent to those skilled in the art that the present disclosure can be modified in many ways without departing from the scope of the inventive idea as disclosed herein.

List of Acronyms and Abbreviations

3GPP Third Generation Partnership Project
AMF access and mobility management function
CAA civil aviation authority
DNN data network name
NSSAA Network Slice-Specific Authentication and Authorization
PDU packet data unit
S-NSSAI single network slice selection assistance information
UAS unmanned/uncrewed aerial system
UAV unmanned/uncrewed aerial vehicle
UCU UE configuration update
UDM unified data management (server)
UDR unified data repository
UE user equipment
USS UAS service supplier
UTM UAS traffic management
UUAA USS UAV authorization/authentication
UUAA-MM UUAA at Registration in 5GS

The invention claimed is:

1. A method of a first network entity comprising an Access and Mobility Management Function (AMF) of a network, the method comprising:

receiving, from a communication endpoint, a non-access stratum registration message including information indicative of unmanned aerial vehicle related capabilities of the communication endpoint;

determining that unmanned aerial system related services are not allowed for the communication endpoint;

sending, to the communication endpoint, a non-access stratum registration message including an indication that the unmanned aerial system related services are not allowed for the communication endpoint;

storing, in a context associated with the communication endpoint, the information indicative of the unmanned aerial vehicle related capabilities of the communication endpoint;

after the sending, receiving, from a unified data management (UDM) server, a notification indicating that the unmanned aerial system related services are enabled for the communication endpoint;

based on the receiving the notification, determining, based on the stored information, that the communication endpoint has the unmanned aerial vehicle related capabilities; and based on the determining that the communication endpoint has the unmanned aerial vehicle related capabilities, transmitting, to the communication endpoint, an unmanned aerial system service status initiated indication comprising
a re-registration request for the communication endpoint, or
information for a configuration update of the communication endpoint.

2. The method according to claim 1, wherein the receiving the information indicative of the unmanned aerial vehicle related capabilities of the communication endpoint, the method further comprises extracting the information indicative of the unmanned aerial vehicle related capabilities of the communication endpoint from a non-access stratum registration message received from the communication endpoint.

3. An apparatus for managing a network, the apparatus comprising at least one processor, and at least one memory including computer program code of an Access and Mobility Management Function (AMF), which, when executed by the at least one processor cause the apparatus to perform operations, the operations comprising:

receiving, from a communication endpoint, a non-access stratum registration message including information indicative of unmanned aerial vehicle related capabilities of the communication endpoint;

determining that unmanned aerial system related services are not allowed for the communication endpoint;

sending, to the communication endpoint, a non-access stratum registration message including an indication that the unmanned aerial system related services are not allowed for the communication endpoint;

storing, in a context associated with the communication endpoint, the information indicative of the unmanned aerial vehicle related capabilities of the communication endpoint;

after the sending, receiving, from a unified data management (UDM) server, a notification indicating that the unmanned aerial system related services are enabled for the communication endpoint;

based on the receiving the notification, determining, based on the stored information, that the communication endpoint has the unmanned aerial vehicle related capabilities; and based on the determining that the communication endpoint has the unmanned aerial vehicle related capabilities, transmitting, to the communication endpoint, an unmanned aerial system service status initiated indication comprising a re-registration request for the communication endpoint, or information for a configuration update of the communication endpoint.

4. The apparatus according to claim 3, wherein the re-registration request includes an indication that the unmanned aerial system related services are enabled for said communication endpoint.

5. The apparatus according to claim 3, wherein the receiving the information indicative of the unmanned aerial vehicle related capabilities of the communication endpoint comprises extracting the information indicative of the unmanned aerial vehicle related capabilities of the communication endpoint from a non-access stratum registration message received from the communication endpoint.

6. A non-transitory computer readable medium storing program instructions of an Access and Mobility Management Function (AMF), which, when executed by at least one processor of an apparatus, cause the apparatus to at least to perform operations, the operations comprising:

receiving, from a communication endpoint, a non-access stratum registration message including information indicative of unmanned aerial vehicle related capabilities of the communication endpoint;

determining that unmanned aerial system related services are not allowed for the communication endpoint;

sending, to the communication endpoint, a non-access stratum registration message including an indication that the unmanned aerial system related services are not allowed for the communication endpoint;

storing, in a context associated with the communication endpoint, the information indicative of the unmanned aerial vehicle related capabilities of the communication endpoint;

after the sending, receiving, from a unified data management (UDM) server, a notification indicating that the unmanned aerial system related services are enabled for the communication endpoint;

based on the receiving the notification, determining, based on the stored information, that the communication endpoint has the unmanned aerial vehicle related capabilities; and based on the determining that the communication endpoint has the unmanned aerial vehicle related capabilities, transmitting, to the communication endpoint, an unmanned aerial system service status initiated indication comprising a re-registration request for the communication endpoint, or information for a configuration update of the communication endpoint.

7. The non-transitory computer readable medium according to claim 6, wherein the re-registration request includes an indication that the unmanned aerial system related services are enabled for said communication endpoint.

8. The non-transitory computer readable medium according to claim 6, wherein the receiving the information indicative of the unmanned aerial vehicle related capabilities of the communication endpoint comprises extracting the information indicative of the unmanned aerial vehicle related capabilities of the communication endpoint from a non-access stratum registration message received from the communication endpoint.

* * * * *